United States Patent [19]
Korczak et al.

[11] Patent Number: 4,562,290
[45] Date of Patent: Dec. 31, 1985

[54] ALKYLENE OXIDE ADDUCTS OF VICINAL TOLUENEDIAMINE

[75] Inventors: Alexander Korczak, Grosse Ile; William W. Levis, Jr., Wyandotte, both of Mich.

[73] Assignee: BASF Wyandotte Corporation, Wyandotte, Mich.

[21] Appl. No.: 326,314

[22] Filed: Dec. 1, 1981

[51] Int. Cl.$^4$ .............................................. C07C 89/02
[52] U.S. Cl. .................................... 564/399; 564/443; 252/182; 521/167; 528/421
[58] Field of Search ................................ 564/399, 443

[56] References Cited

U.S. PATENT DOCUMENTS

| | | | |
|---|---|---|---|
| 3,423,344 | 1/1969 | Odinak et al. | 564/330 X |
| 3,462,492 | 8/1969 | Kober | 564/443 |
| 3,499,009 | 3/1970 | Odinak et al. | 564/330 X |
| 4,209,609 | 6/1980 | Haas | 528/421 |

FOREIGN PATENT DOCUMENTS

| | | | |
|---|---|---|---|
| 972772 | 10/1964 | United Kingdom | 564/443 |
| 1001946 | 8/1965 | United Kingdom | 564/359 |

Primary Examiner—Robert V. Hines
Attorney, Agent, or Firm—William G. Conger; Joseph D. Michaels; David L. Hedden

[57] ABSTRACT

The subject invention relates to adducts of vicinal toluenediamine prepared by:
(a) reacting from one to three moles of ethylene oxide with vicinal toluenediamine at a temperature of 125° C., and
(b) reacting the product of (a) with four to eight moles of propylene oxide at a temperature of at least 140° C. in the present of at least 1.0 part of an alkali metal hydroxide catalyst.

The adducts generally have a hydroxyl number of 300 to 500 and are particularly useful for the preparation of rigid polyurethane foams.

10 Claims, No Drawings

ALKYLENE OXIDE ADDUCTS OF VICINAL TOLUENEDIAMINE

BACKGROUND OF THE INVENTION

1. Field of the Invention

The subject invention relates to polyol compositions which are alkylene oxide adducts of vicinal toluenediamine. The subject polyol compositions are prepared by a two-step process and are particularly useful in the preparation of rigid polyurethane foams.

2. Description of the Prior Art

Alkylene oxide adducts of various aromatic amines are well known in the art. It is also known that such adducts can be used in the preparation of polyurethane foams.

Generally alkylene oxide adducts of aromatic amines are prepared by reacting an alkylene oxide with an aromatic amine at temperatures of 90° C. to 125° C. in the presence of an alkoxylation catalyst. These temperatures are preferred in order to avoid undesirable side reactions which decrease the yield of the desired product. Moreover, low levels of catalyst (0.2 part or less per 100 parts of amine) are also preferred because this reduces the time and expense needed to remove the catalyst.

It is also known that such adducts can be prepared by adding the alkylene oxide in two steps. For instance, U.S. Pat. No. 4,209,609 shows the preparation of an alkylene oxide adduct of 2,4-toluenediamine and 2,6-toluenediamine using a two-step alkoxylation process whereby from 3 to 5 moles of ethylene oxide are reacted with the toluenediamine and then 1 to 5.1 moles of propylene oxide are reacted with the adduct prepared in accordance with the first step.

None of the disclosures in the prior art, however, teaches or suggests the preparation of alkylene oxide adducts of vicinal toluenediamine nor do they suggest the reaction conditions specified herein. As will be demonstrated herein, it has been found that alkylene oxide adducts of vicinal toluenediamines prepared under the specified reaction conditions have lower viscosities than alkylene oxide adducts prepared from other isomers of toluenediamine, and that such adducts of vicinal toluene diamine have lower viscosities than those which are not prepared in accordance with the reaction conditions specified herein.

SUMMARY OF THE INVENTION

The subject invention relates to adducts of vicinal toluenediamine prepared by:

(a) reacting from 1 to 3 moles of ethylene oxide with vicinal toluenediamine at a temperature of less than 125° C., and (b) reacting the product of (a) with 4 to 8 moles of propylene oxide at a temperature of at least 140° C. in the presence of at least 1.0 part of an alkali metal hydroxide catalyst.

The subject polyols generally have a hydroxyl number between 300 and 500 which makes them particularly useful in the preparation of rigid polyurethane foams. The subject polyols also have surprisingly low viscosities, generally around 10,000 cps at 25° C. and often below 5,000 cps.

DESCRIPTION OF THE PREFERRED EMBODIMENTS

The subject polyols are prepared according to conventional two-step processes with the exception that increased temperature and catalyst level are utilized in the second step. Those skilled in the art will know what equipment is needed and what precautions are necessary for preparing the subject polyols. Therefore, a detailed explanation of the process for preparing the subject polyols will not be provided except in the examples which follow.

For the purpose of the subject invention, the term "vicinal toluenediamine" is intended to include 2,3-toluenediamine and 3,4-toluenediamine, and mixtures thereof. The term is also intended to include small amounts of non-vicinal isomers of toluenediamine, such as 2,4-toluenediamine, 2,6-toluenediamine, and 2,5-toluenediamine. No more than 20% by weight of the nonvicinal isomers should be present in the toluenediamine mixture which is used.

Preferably used as the alkali metal hydroxide catalyst in the second step of the reaction are potassium or sodium hydroxide. The amount of catalyst used must be at least 1.0 part by weight per 100 parts by weight of toluenediamine. This amount of catalyst is needed to obtain a product with the desired viscosity.

The second step of the reaction takes place at temperatures of at least 140° C. Generally, however, it is preferred to use temperatures of at least 150° C. in order to produce polyol compositions with the desired viscosity.

The methods utilized for preparing polyurethane foams from the subject polyols are well known to those skilled in the art. As was previously indicated, the polyols are particularly useful for the preparation of rigid foams because their hydroxyl numbers generally are in the range of 300 to 500. Preferably the subject polyols are blended with polyols having lower reactivity in order to prepare polyurethane foams. It has been found that subject polyols are highly reactive and that the reactivity can be moderated by blending them with less reactive polyols. Because of their low viscosities it is possible to blend them with polyols which, because of their high viscosity, would not be acceptable for the preparation of polyurethane foams. The resulting blend thus will have acceptable reactivity and viscosity.

Polyurethane foams are prepared from the subject polyols, or blends of the subject polyols and customarily used polyols, by reacting them with an organic polyisocyanate in the presence of a blowing agent. Organic polyisocyanates which can be used to prepare the polyurethane foams are those customarily used and may be represented by the following formula:

wherein R″ is a polyvalent organic radical which is either aliphatic, aralkyl, alkaryl, aromatic or mixtures thereof, and z is an integer which corresponds to the valence of R″ and is at least two. Representative of the organic polyisocyanates contemplated herein includes, for example, aromatic diisocyanates such as 2,4-toluene diisocyanate, 2,6-toluene diisocyanate, mixtures of 2,4- and 2,6-toluene diisocyanate, crude toluene diisocyanate, diphenylmethane diisocyanate, crude diphenylmethane diisocyanate and the like; aromatic triisocyanates such as 4,4′,4″-tri-phenylmethane triisocyanate, 2,4,6-toluene triisocyanates; aromatic tetraisocyanates such as 4,4′-dimethyldiphenylmethane-2,2′,5,5′-tetraisocyanate, and the like; aralkyl polyisocyanates such as xylylene diisocyanate; aliphatic polyisocyanates such as hexamethylene-1,6-diisocyanate, lysine diisocyanate methylester and the like, and mixtures thereof. Other organic polyisocyanates include hydrogenated methylene diphenylisocyanate, m-phenylene diisocyanate, naphthalene-1,5-diisocyanate, 1-methoxyphenylene-2,4-diisocyanate, 4,4′-biphenylene diisocyanate, 3,3′-dimethoxy-4,4′-biphenyl diisocyanate, 3,3′-dimethyl-4,4′-biphenyl diisocyanate, and 3,3′-dimethyldiphenylmethane-4,4′-diisocyanate. These polyisocyanates are prepared by conventional methods known in the art such as the phosgenation of the corresponding organic amine. Included within the usable isocyanates are modifications of the above isocyanates which contain carbodiimide, allophanate or isocyanurate structures. Quasi-prepolymers may also be employed in the process of the subject invention. These quasi-prepolymers are prepared by reacting an excess of organic polyisocyanate or mixtures thereof with a minor amount of an active hydrogen-containing compound as determined by the well-known Zerewitinoff test, as described by Kohler in *Journal of the American Chemical Society*, Vol. 49, page 3181 (1927). These compounds and their methods of preparation are well known in the art. The use of any one specific active hydrogen compound is not critical hereto, rather any such compound can be employed herein. Generally, the quasi-prepolymers have a free isocyanate content of from 20 percent to 40 percent by weight.

As was indicated previously, the organic polyisocyanate is reacted with the subject polyols or blends of the subject polyols and polyols customarily used. By "polyols customarily used" is meant polyols which generally have an equivalent weight of from 50 to 300 and an average functionality of from 2 to 6. The amount of these polyols used is such that from 10 to 90 parts by weight are present per 100 parts of polyol blend. Suitable polyols include: hydroxyl-terminated polyesters; polyoxyalkylenepolyether polyols; alkylene oxide adducts of organic compounds having at least 2 reactive hydrogen atoms such as amines, and thiols; and hydroxy-terminated acetals.

Any suitable hydroxy-terminated polyester may be used such as are obtained, for example, from the reaction of polycarboxylic acids of polycarboxylic acid anhydrides and polyhydric alcohols. Any suitable polycarboxylic acid may be used in the preparation of hydroxy-terminated polyesters such as succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-butyl-α-ethyl-glutaric acid, α,β-diethylsuccinic acid, phthalic acid, isophthalic acid, terephthalic acid, hemimellitic acid, and 1,4-cyclohexanedicarboxylic acid. Anhydrides such as phthalic, tetrachloro-phthalic, tetrabromophthalic, maleic, and 1,4,5,6,7,7-hexachlorobicyclo-(2,2,1)-5-heptane-2,3-dicarboxylic acid anhydride also may be used in the preparation of the hydroxy-terminated polyesters. Any suitable polyhydric alcohol, including both aliphatic and aromatic, may be reacted with the polycarboxylic acid or polycarboxylic acid anhydride to prepare the hydroxy-terminated polyesters. Representative examples include ethylene glycol, 1,3-propanediol, 1,2-propane glycol, 1,4-butanediol, 1,3-butanediol, 1,2-butane glycol, 1,5-pentanediol, 1,4-pentanediol, 1,3-pentanediol, 1,6-hexanediol, 1,7-heptanediol, 2-butene-1,4-diol glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenolic compounds such as 2,2-bis(4-hydroxyphenyl)propane, commonly known as Bisphenol A and hydroxyalkyl ethers of such phenolic compounds such as bis-2-hydroxyethyl ether of hydroxyquinone, and the alkylene oxide adducts of the above-named polyhydric alcohols.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine. The hydroxy-terminated polyester may also be a hydroxy-terminated polycaprolactone polyol.

Polyoxyalkylene ether polyols are preferably used as the polyol. These compounds are prepared by reacting an alkylene oxide with a polyhydric alcohol. Any suitable polyhydric alcohol may be used in the preparation of the polyoxyalkylene polyether polyol, such as those disclosed above for use in the preparation of the hydroxy-terminated polyesters. Any suitable alkylene oxide may be reacted with the polyhydric alcohol to prepare the polyoxyalkylene polyol. Representative examples include ethylene oxide, propylene oxide, butylene oxide, amylene oxide, styrene oxide, or mixtures thereof. Polyoxyalkylene polyols derived from two or more oxides may possess either block or heteric structure. In addition to polyoxyalkylene polyols, other compounds such as polyols derived from tetrahydrofuran and alkylene oxide-tetrahydrofuran mixtures may be used. The polyoxyalkylene polyether polyols preferably have primary hydroxyl groups, but may have secondary hydroxyl groups, and preferably, are polyethers prepared from alkylene oxides having from two to six carbon atoms such as polyethylene ether glycols, polyoxypropylene ether glycols and polyoxybutylene ether glycols. The polyoxyalkylene polyether polyols may be prepared by any known process such as, for example, the process disclosed by Wurtz in 1859 and in *Encyclopedia of Chemical Technology*, Vol. 7, pp. 257–262, published by Interscience Publishers, Inc. (1951), or the process disclosed in U.S. Pat. No. 1,922,459. Alkylene oxide adducts of Mannich condensation products are also useful in the invention.

In addition to the polyoxyalkylene polyether polyols just described, graft polyoxyalkylene polyether polyols may also be used in the preparation of the reactive polyol composition. These polyols are prepared by the in situ polymerization of a vinyl monomer or monomers in a reactive polyol medium and in the presence of a free radical initiator. The reaction is generally carried out at a temperature ranging from about 40° C. to 150° C. A more comprehensive discussion of the graft polyols and their method of preparation can be found in U.S. Pat. Nos. 4,208,314, 3,383,351 (U.S. Pat. No. Re. 28,715), 3,304,273, 3,652,639, and 3,823,201 (U.S. Pat. No. Re. 29,014).

As was previously mentioned, other suitable polyols, which can be used in the reactive polyol composition of this invention, include the alkylene oxide adducts of organic compounds having at least two active hydrogens, such as amines and thiols. The alkylene oxides which are useful in this regard are the same as those described in connection with the preparation of polyoxyalkylene polyether polyols.

Suitable thiols which may be reacted with an alkylene oxide include alkane thiols containing at least two -SH groups such as 1,2-ethanedithiol, 1,2-propanedithiol, 1,3-propanedithiol, and 1,6-hexanedithiol; and alkenethiols such as 2-butene-1,4-dithiol, and alkynethiols such as 3-hexyne-1,6-dithiol.

Suitable polyamines which can be reacted with an alkylene oxide include aromatic polyamines such as methylene dianiline, polyaryl-polyalkylene polyamine (crude methylene dianiline), p-aminoaniline, 1,5-diaminonaphthalene, and 2,4-diaminotoluene; aliphatic polyamines such as ethylenediamine, 1,3-propanediamine, 1,4-butanediamine, and 1,3-butanediamine, as well as substituted secondary derivatives thereof.

As was previously mentioned, hydroxy-terminated polyacetals may also be used as polyols in accordance with this invention. These may be prepared, for example, by the reaction of formaldehyde or other suitable aldehyde with a dihydric alcohol or an alkylene oxide such as those previously described.

In order to prepare a rigid polyurethane foam, the organic polyisocyanate is reacted with the polyol component in the presence of a blowing agent and preferably a catalyst such that the ratio of isocyanate groups of the organic polyisocyanate to active hydrogens of the polyol ranges from 1:0.9 to 1:1.15.

Blowing agents which are employed in the present invention are well known to those skilled in the art. Representative blowing agents include water, fluorocarbons such as trichloromonofluoromethane, 1,1,1-trichloro-2,2,2-trifluoroethane, tetrafluoromethane, bromotrifluoromethane, chlorotrifluoromethane, dibromodifluoromethane, trichlorethylene, chloroform, carbon tetrachloride and low boiling hydrocarbons duch as butane, pentane and hexane. Included are the blowing agents disclosed in U.S. Pat. No. 3,922,238.

Catalysts are also preferably employed. Catalysts which may be used include organometallic catalysts such as dibutyltin dilaurate, dibutyltin diacetate, stannous octoate, lead octoate, and cobalt naphthenate; tertiary amine catalysts such as, triethylenediamine, 1,3,5-vicinal-(3-dimethylaminopropyl)-s-hexahydrotriazine; and other catalysts customarily used in the preparation of polyurethane foams.

Other additives may also be included in the foam formulations. Included are surfactants such as the silicone surfactants, e.g., polyoxyalkylene-polyalkylsiloxane, and flame retardants such as vicinal(2-chloroethyl)-phosphate.

The Examples which follow will provide detailed descriptions how to make and use the subject polyols, but are not intended to limit the scope of the invention. Parts referred to in the Examples are by weight, and the temperatures are in degrees Centigrade unless otherwise designated.

EXAMPLES 1-5

The toluenediamine used in preparing the following polyols was a mixture consisting of approximately 90% by weight of an approximately 1:1 weight ratio of 2,3-toluenediamine and 3,4-toluenediamine and 10% by weight of a mixture of 2,4-toluenediamine and 2,6-toluenediamine.

The preparation of polyols consisted of a two-step process. In the first step the molten and well mixed toluenediamine was charged to a clean, dry stainless steel reactor. The reactor was then purged with nitrogen, pressure checked, heated to 125° C., and the pressure was adjusted to 34 psig with nitrogen. The reactor was then sealed and the ethylene oxide was added at 125° C. at less than 90 psig over a period of two hours, followed by reaction at 125° C. for three hours and slow venting to 0 psig. In the second step the catalyst was added to the reactor, the reactor was sealed and heated to 150° C. The propylene oxide was then added over a period of seven hours at less than 90 psig and allowed to react for two to three hours at 150° C. The product was then cooled to 60° C. before discharging. The work-up of the crude polyol was carried out by neutralizing the crude polyol with phosphoric acid followed by stripping for one hour at 125° C. at less than 10 mm mercury, or the crude polyol was treated with an absorbent to remove the alkaline catalyst, filtered and stripped for 1 hour at 125° C. at less than 10 mm mercury.

The viscosity of the product in cps was determined at 25° C. The specific ingredients used are provided in Table I which follows. Table I also provides data on the viscosity of the polyols.

TABLE I

| Examples | Moles EO/ Mole TDA | Moles PO | KOH (part/100) parts TDA | Viscosity cps at 25° C. |
| --- | --- | --- | --- | --- |
| 1 | 2.5 | 4.23 | 1.0 | 11,200 |
| 2 | 2.0 | 4.62 | 1.0 | 10,160 |
| 3 | 2.0 | 6.28 | 1.0 | 4,624 |
| 4 | 1.0 | 7.04 | 1.0 | 3,704 |
| 5 | 1.0 | 5.40 | 1.0 | 8,220 |

The data in Table I show that if the teachings described herein are followed, it is possible to prepare alkylene oxide adducts of vicinal toluenediamine having low viscosities. The following comparative examples will show the benefits derived from following the teachings herein.

COMPARISON EXAMPLES

Comparison Example A

In order to illustrate the the significant in using vicinal TDA instead of an 80/20 mixture of 2,4/2.6 toluenediamine, Example 5 was duplicated except a mixture of 80/20 toluenediamine was used. The viscosity of the resulting product was 34,720 cps at 25° C. Example 2 was also repeated using a mixture of 80/20 2,4/2,6 toluenediamine and the resulting viscosity was 31,200.

Comparison Example B

In order to illustrate the effect of using lesser amounts of catalyst when preparing the alkylene oxide adducts of vicinal toluenediamine, Example 2 was duplicated except that 0.5 part of catalyst was used per 100 parts of vicinal toluenediamine and the temperature in the first step was increased to 150° C. The viscosity of the resulting product was 24,480 cps at 25° C. (Results from other experiments indicate that this viscosity would have been even higher if the temperature of the reaction had not been increased in the first step.)

Comparison Example C

In order to illustrate the effects of using lower temperatures in the subject process, Example 2 was duplicated except that temperatures of 110° were used in the first step and second step of the reaction. The viscosity of the resulting product was 49,040 cps at 25° C.

Comparison Example D

In order to illustrate the effects of using more ethylene oxide in the first step of the reaction, a polyol was prepared under the reaction conditions used for Examples 1-5 except that 3.6 moles of ethylene oxide were added in the first step of the reaction and 3.4 moles of propylene oxide were added in the second step of the reaction. The viscosity of the resulting polyol was 20,300 cps at 25° C.

The examples discussed herein illustrate the importance of reactants and reaction conditions to the preparation of toluenediamine polyols having low viscosities.

The embodiments of the invention in which an exclusive property or privilege is claimed are defined as follows:

1. An adduct of vicinal toluenediamine prepared by (a) reacting vicinal toluenediamine with from one to three moles of ethylene oxide per mole of vicinal toluenediamine at a temperature of 125° C. or less, and (b) reacting the product of (a) with from four to eight moles of propylene oxide at a temperature of at least 140° C. in the presence of at least 1.0 part of an alkali metal hydroxide catalyst based upon 100 parts of vicinal toluenediamine.

2. The polyol of claim 1 wherein the vicinal toluenediamine is a mixture consisting essentially of about 90% by weight of an approximately 1:1 weight ratio of 2,3-toluenediamine and 3,4-toluenediamine and 10% by weight of 2,4-toluenediamine and 2,6-toluenediamine.

3. The adduct of claim 1 wherein potassium hydroxide is used as the alkali metal hydroxide in the second step of the reaction.

4. The adduct of claim 1 wherein the second step of the reaction takes place at temperatures of at least 150° C.

5. The adduct of claim 1 wherein from 1.0 to 2.0 parts of alkali metal hydroxide catalyst are used in the second step of the reaction based upon 100 parts of vicinal toluenediamine.

6. A process for preparing an adduct of vicinal toluenediamine comprising the steps of (a) reacting vicinal toluenediamine with from one to three moles of ethylene oxide per mole of vicinal toluenediamine at a temperature of 125° C. or less, and (b) reacting the product of (a) with from four to eight moles of propylene oxide at a temperature of at least 140° C. in the presence of at least 1.0 part of alkali metal hydroxide catalyst based upon 100 parts of vicinal toluenediamine.

7. The polyol of claim 6 wherein the vicinal toluenediamine is a mixture containing about 90% by weight of an approximately 1:1 weight of 2,3-toluenediamine and 3,4-toluenediamine and 10% by weight of a mixture of 2,4-toluenediamine and 2,6-toluenediamine.

8. The process of claim 6 wherein potassium hydroxide is used as the alkali metal hydroxide in the second step of the reaction.

9. The process of claim 6 wherein the second step of the reaction takes place at temperatures of at least 150° C.

10. The process of claim 6 wherein from 1.0 to 2.0 parts of alkali metal hydroxide catalyst, based upon 100 parts of vicinal toluenediamine, are used in the second step of the reaction.

* * * * *